United States Patent
Kumar et al.

(10) Patent No.: US 8,890,464 B2
(45) Date of Patent: Nov. 18, 2014

(54) VARIABLE-SPEED-DRIVE SYSTEM FOR A GRID BLOWER

(75) Inventors: Ajith Kuttannair Kumar, Erie, PA (US); Bret Worden, Union City, PA (US); Sudhir Kumar Gupta, Erie, PA (US); Theodore Clark Brown, Ripley, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/450,256

(22) Filed: Apr. 18, 2012

(65) Prior Publication Data

US 2012/0199039 A1 Aug. 9, 2012

Related U.S. Application Data

(62) Division of application No. 12/132,479, filed on Jun. 3, 2008, now Pat. No. 8,179,084.

(51) Int. Cl.
| | | |
|---|---|---|
| *H02P 27/04* | (2006.01) | |
| *B61C 5/02* | (2006.01) | |
| *B60L 7/02* | (2006.01) | |
| *B60L 7/10* | (2006.01) | |
| *B60L 1/00* | (2006.01) | |

(52) U.S. Cl.
CPC ... *B61C 5/02* (2013.01); *B60L 7/02* (2013.01); *B60L 7/10* (2013.01); *B60L 1/003* (2013.01)
USPC ........... 318/800; 318/366; 318/460; 318/471; 361/695; 361/696; 701/1; 701/19; 701/22

(58) Field of Classification Search
CPC ............. B60L 7/02; B60L 7/22; B60L 11/123
USPC .......... 318/800, 366, 460, 471; 361/695, 696; 701/1, 19, 22
See application file for complete search history.

(56) References Cited

U.S. PATENT DOCUMENTS

| | | | |
|---|---|---|---|
| 5,629,596 | A | 5/1997 | Iijima et al. |
| 5,747,959 | A | 5/1998 | Iijima et al. |

(Continued)

FOREIGN PATENT DOCUMENTS

| | | |
|---|---|---|
| EP | 1610454 A1 | 12/2005 |
| JP | 62081901 A | 4/1987 |
| JP | 6046505 A | 2/1994 |

OTHER PUBLICATIONS

ISA European Patent Office, International Search Report of PCT/US2009/043421, Apr. 16, 2010, WIPO, 6 pages.

(Continued)

*Primary Examiner* — Erick Glass
(74) *Attorney, Agent, or Firm* — John A. Kramer; GE Global Patent Operation (57) ABSTRACT

A drive system for a grid blower of a vehicle is provided. The system includes: an electrical bus, a grid of resistive elements connected to the electrical bus, the grid of resistive elements configured to thermally dissipate electrical power generated from braking of the vehicle, the electrical power being transmitted on the electrical bus to the grid of resistive elements, an electrical power modulation device configured to modify electrical power received from at least one of the electrical bus and the grid of resistive elements, and a grid blower motor coupled to an output of the electrical power modulation device, wherein a speed of the grid blower motor varies based on the electrical power that has been modified by the electrical power modulation device.

15 Claims, 6 Drawing Sheets

(56) References Cited

U.S. PATENT DOCUMENTS

| | | | |
|---|---|---|---|
| 6,486,568 B1 * | 11/2002 | King et al. | 307/66 |
| 6,725,134 B2 * | 4/2004 | Dillen et al. | 701/19 |
| 7,185,591 B2 * | 3/2007 | Kumar et al. | 105/35 |
| 7,330,012 B2 | 2/2008 | Ahmad et al. | |
| 2006/0086547 A1 | 4/2006 | Shimada et al. | |
| 2007/0144398 A1 | 6/2007 | Kumar et al. | |

OTHER PUBLICATIONS

ISA European Patent Office, Written Opinion of PCT/US2009/043421, Apr. 16, 2012, WIPO, 11 pages.

* cited by examiner

VARIABLE-SPEED-DRIVE SYSTEM FOR A GRID BLOWER

CROSS REFERENCE TO RELATED APPLICATIONS

The present application is a divisional of U.S. patent application Ser. No. 12/132,479 filed Jun. 3, 2008, the entire contents of which are incorporated herein by reference for all purposes.

BACKGROUND

A propulsion system may include one or more traction motors to generate tractive output. For example, a propulsion system having one or more traction motors may be utilized in an off-highway vehicle (OHV) application, locomotive application, a marine application, a drilling application, etc. In one example, a locomotive vehicle having traction motors may perform dynamic braking in conjunction with air braking in order to slow the locomotive vehicle. By utilizing dynamic braking, the brake load on the air brakes may be reduced which, in turn, may reduce the wear on the air brakes thus extending their useful life.

During dynamic braking operations, the traction motors may generate electrical power that may be transmitted to a grid of resistive elements which may dissipate the electrical power in the form of heat. As dynamic braking operations are performed, the temperature of the grid of resistive elements may increase. Accordingly, a blower may be utilized to provide forced-air cooling to the grid of resistive elements. In one example, the blower is powered by a motor that is coupled to taps across the grid of resistive elements. As such, the blower operates whenever there is electrical power on the grid of resistive elements, such as during a dynamic braking operation. Since the blower is directly powered by electrical power from the grid of resistive elements, additional electrical power need not be generated specifically to power the blower.

However, various issues may arise with the above described configuration. As a first example, since the blower motor is directly connected to the taps across the resistive elements of the grid, the speed of the blower depends on the electrical power on the grid of resistive elements. As another example, the blower accelerates at a high rate whenever electrical power is suddenly applied to the grid of resistive elements, thereby producing high transients which may result in increased noise, vibration, harshness, and stress on the equipment.

BRIEF DESCRIPTION OF THE INVENTION

Accordingly, to address at least some of the above issues, a drive system for a grid blower of a vehicle is described herein. For example, in one embodiment, the system comprises: an electrical bus; a grid of resistive elements connected to the electrical bus, the grid of resistive elements configured to thermally dissipate electrical power generated from braking of the vehicle, the electrical power being transmitted on the electrical bus to the grid of resistive elements; an electrical power modulation device configured to modify electrical power received from at least one of the electrical bus and the grid of resistive elements; and a grid blower motor coupled to an output of the electrical power modulation device, wherein a speed of the grid blower motor varies based on the electrical power that has been modified by the electrical power modulation device.

Since the electrical power supplied to the grid blower motor may be varied from the electrical power on the grid of resistive elements, it is possible to decouple the speed of the grid blower from the electrical power on the grid of resistive elements. As such, the speed of the grid blower may be varied as desired. For example, the voltage provided to the grid blower motor may be increased in order to increase the rate of acceleration, and/or speed, of the grid blower beyond what the electrical power on the grid of resistive elements could provide. As another example, the grid blower speed may be controlled without changing the braking power dissipated in the grid of resistive elements. The varied operation of the grid blower may enhance the forced-air cooling effects on the grid of resistance elements, thereby increasing the useful life of the grid of resistive elements and/or increasing the braking capabilities of the traction system.

Furthermore, speed control may be used to reduce stress and/or wear of the grid blower. For example, the acceleration or deceleration of the grid blower may be controlled between speed levels to limit the stress from inertial forces. As another example, throughout frequently varying operation conditions, such as varying dynamic braking power between high and low levels where different levels of electrical power flow across the grid of electrical elements, the grid blower speed may be held substantially constant. Due to the substantially constant speed of operation, the centrifugal force related stress cycles on the grid blower impeller or fan blades may be reduced. Accordingly, the life of the grid blower may be extended.

Furthermore, under some conditions, it may be desirable to reduce the audible noise output level of the locomotive vehicle, and more particularly, the grid blower. Therefore, the voltage provided to the grid blower motor may be reduced in order to reduce the speed of the grid blower, thereby reducing the audible noise output level of the grid blower without changing the power dissipated in the braking grids. In an example where multiple grid blowers powered by multiple inverters are implemented in a traction system, the blower impeller blade phase or frequency relationship may be controlled to reduce or minimize audible noise output or reduce monotonic noise.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
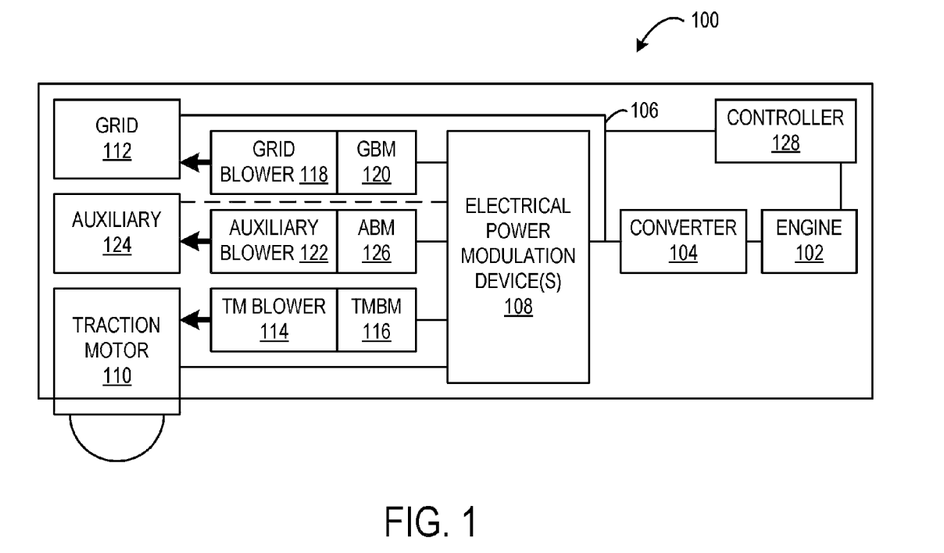
FIG. 1 shows a schematic diagram of a locomotive vehicle system.

The subject matter disclosed herein generally relates to propulsion systems utilizing tractive effort. In particular, the subject matter relates to mechanisms that may be utilized to aid in heat dissipation from electrical power dissipation grids of a locomotive vehicle having traction motors. FIG. 1 schematically shows an example of a locomotive vehicle system 100. Typically, the locomotive vehicle system may be a diesel-electric locomotive that includes a diesel engine. However, it will be appreciated that engine configurations other than a diesel engine may be implemented in the locomotive vehicle system, such as a gasoline engine, for example. In some embodiments, the locomotive vehicle system may be powered by way-side power and the engine may be omitted (e.g., electric locomotives).

The locomotive vehicle system 100 includes an engine 102 that may be configured to generate torque output that drives a converter 104. The converter 104 may produce electrical power that may be provided to various electrical components by an electrical bus 106. In some embodiments, the converter may include one or more alternators that produce alternating current (AC) electrical power. In some embodiments, the converter may include one or more rectifiers that produce direct current (DC) electrical power. Further, in some embodiments, the converter may include both one or more alternators and one or more rectifiers. Correspondingly, in some embodiments, the electrical bus may be a DC electrical bus. Further, in some embodiments, the electrical bus may be an AC electrical bus.

One or more electrical power modulation device(s) 108 may receive electrical power from the electrical bus 106. The electrical power modulation device(s) 108 may be configured to modify the electrical power received from the electrical bus 106 to a suitable form to be provided to electrical components of the locomotive vehicle system. In particular, the electrical power modulation device may be configured to modify a parameter of the electrical power such as voltage or frequency, for example. In some embodiments, the electrical power modulation device may include an inverter. In one example, the inverter converts DC electrical power to AC electrical power, among other modifications. In some embodiments, the electrical power modulation device may include a converter. In one example, the converter modifies the voltage of DC electrical power from the DC electrical bus to a different voltage in order to supply the DC electrical power to a DC electrical component.

A traction motor 110 may receive electrical power from the electrical power modulation device(s) 108 to provide tractive power in order to propel the locomotive. For the purpose of simplicity, only one traction motor is illustrated. However, it will be appreciated that a plurality of traction motors may provide tractive power to propel the locomotive vehicle using electrical power provided from the electrical bus.

Furthermore, the traction motor 110 may be configured to act as a generator to provide dynamic braking to slow the locomotive. In particular, during dynamic braking, the traction motor 110 may provide torque in a direction that is opposite from the rolling direction of the locomotive which, in turn, generates electrical power that may be sent through the electrical bus 106 to a grid 112 where the electrical power may flow across a plurality of resistive elements of the grid and may be dissipated in the form of heat.

In some embodiments, the electrical bus may include one or more switches (not shown) that may be adjusted to control the transmission of electrical power. For example, during dynamic braking a state of a switch may be changed to send electrical power generated by the traction motor to the grid of resistive elements in order to be thermally dissipated.

In one particular example, the grid includes stacks of resistive elements connected in series to the electrical bus. The stacks of restive elements may be positioned proximate to the ceiling of a hood of the locomotive in order to facilitate air cooling and heat dissipation from the grid. Alternatively, other suitable grid configurations may be implemented.

Furthermore, during operation of the locomotive, the temperature of the grid and the traction motor may increase. Accordingly, the grid and the traction motor may be force-air cooled. In particular, a traction motor blower 114 may blow air to cool the traction motor 110. The traction motor blower 114 may be powered by a traction motor blower motor 116 that is configured to receive electrical power from the electrical power modulation device(s) 108 which modifies electrical power received from the electrical bus 106. Likewise, a grid blower 118 may blow air to cool the grid 112. The grid blower 118 may be powered by a grid blower motor 120 that is configured to receive electrical power from the electrical power modulation device(s) 108 which modifies electrical power received from the electrical bus 106. It will be appreciated that locomotive vehicle system 100 may include plural grid blowers to cool one or more resistive element grid(s).

Furthermore, other components of the vehicle locomotive system 100 may be force-air cooled. In particular, an auxiliary blower 122 may blow air to cool an auxiliary component 124. The auxiliary blower 122 may be powered by an auxiliary blower motor 126 that is configured to receive electrical power from the electrical power modulation device(s) 108 which modifies electrical power received from the electrical bus 106.

In some embodiments, the auxiliary component may receive electrical power from the electrical bus. For example, the auxiliary component may include a compression device configured to compress intake air, such as a supercharger or a turbocharger. However, the auxiliary component need not receive electrical power. For example, the auxiliary component may include a radiator for cooling the diesel engine. In some embodiments, the auxiliary blower may be used to cool intake air prior to entering a compression device in order to improve engine efficiency.

It will be appreciated that the locomotive vehicle system may include a plurality of different electrical power modulation devices, each of which may supply electrical power to a different component. Alternatively or optionally, the locomotive vehicle system may include one or more electrical power modulation device(s) connected to a switch that may be controlled to selectively provide electrical power to different components connected to the switch.

Locomotive vehicle system 100 may include a controller 128 configured to control components of the locomotive vehicle system (e.g., engine, traction motor, blower drives, etc.). The controller 128 may include a microcomputer having a processor and electronic storage media for executing programs and storing calibration and control data. The controller 128 may receive signals from sensors coupled to components of the locomotive vehicle system and may perform feedback and/or feedforward control based on the signals. Examples of signals that may be received by the controller include engine speed, motor speed, blower speed, engine temperature, motor temperature, grid temperature, ambient temperature, engine load, motor load, voltage, current, etc. Furthermore, the controller 128 may be configured to vary blower speed based on various operating conditions by adjusting the state of electrical power modulation devices that provide electrical power to blower motors. In particular, an electrical power modulation device may include a plurality of switches, the state of which may be toggled to modulate electrical power. For example, an electrical power modulation device may be controlled to raise/lower voltage, increase/decrease frequency, adjust phase, etc.

Figure 2:
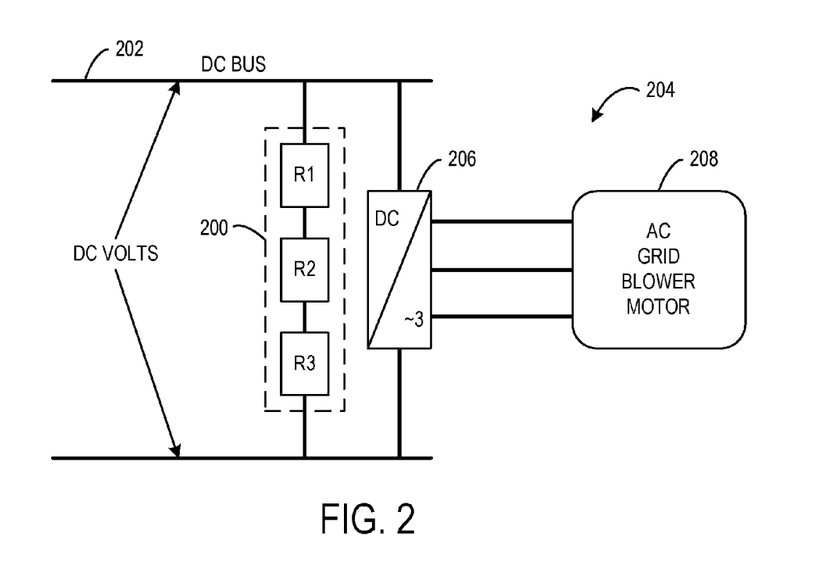
FIG. 2 shows a schematic diagram of one embodiment of a grid blower drive configuration.

FIG. 2 schematically shows one embodiment of a grid blower drive configuration of the present disclosure. In the illustrated embodiment, a grid 200 includes three resistive elements (R1, R2, R3) that are connected in series to a DC electrical bus 202. It will be appreciated that the grid may include virtually any suitable number of resistive elements to dissipate electrical power in the form of heat.

As discussed above, during dynamic braking, electrical power may be generated as a result of the traction motor generating torque to slow the locomotive. The generated electrical power may be transferred from the traction motor through the DC bus to the resistive elements of the grid. Consequently, the temperature of the resistive elements of the grid may increase up to a temperature of approximately six hundred degrees Celsius or more, for example. A blower (not shown) may be operated to blow air at the grid in order to aid in dissipation of the heat. The blower may be powered by a grid blower drive 204 that includes an AC grid blower motor 208. The AC grid blower motor 208 may be coupled to an inverter 206 that may be coupled to taps on the DC bus 202. The inverter 206 may be configured to provide variable frequency and/or variable voltage output to the AC grid blower motor 208. As a particular example, the inverter may be a DC to three phase inverter having three phase output. It will be appreciated that, in the illustrated embodiment of the drive configuration, since the inverter is directly connected to the DC bus the grid blower motor may be powered by the entire voltage on the DC bus, if desired, in order to operate the grid blower at a high speed.

Since the AC grid blower motor receives electrical power from the inverter rather than directly from across the resistors, the operation of the grid blower motor and correspondingly the speed of the grid blower may be decoupled from the electrical power on the grid. In other words, the speed of the grid blower may be operated and adjusted independent of the amount of electrical power on the grid. By enabling independent speed control of the grid blower motor, the acceleration and/or speed of the grid blower may be varied regardless of a voltage level on the grid of resistive elements. Accordingly, the grid blower speed may be controlled to enhance cooling of the grid which may extend the usable lifetime of the grid as well as increase the braking capability of the locomotive.

Furthermore, due to the variable speed control of the grid blower, under some conditions, the speed of the grid blower may be advantageously reduced or maintained at a substantially constant speed. For example, grid blower speed may be reduced to reduced inertial stress on impeller or fan blades of the grid blower in order to extend the useful lifetime of the grid blower. As another example, the speed of the grid blower may be reduced in order to reduce the audible noise level of the grid blower to a desired audible noise level. In contrast, a grid blower drive configured so that speed of the grid blower is based on an amount of electrical power across the grid may be incapable of voluntarily reducing the speed of the grid blower. Grid blower control strategies for managing audible noise will be discussed in further detail below with reference to FIG. 7. Further, the speed of the grid blower may be maintained at a substantially constant speed even as electrical power on the grid or bus varies in order to reduce stress on the grid blower from centrifugal forces.

Figure 3:
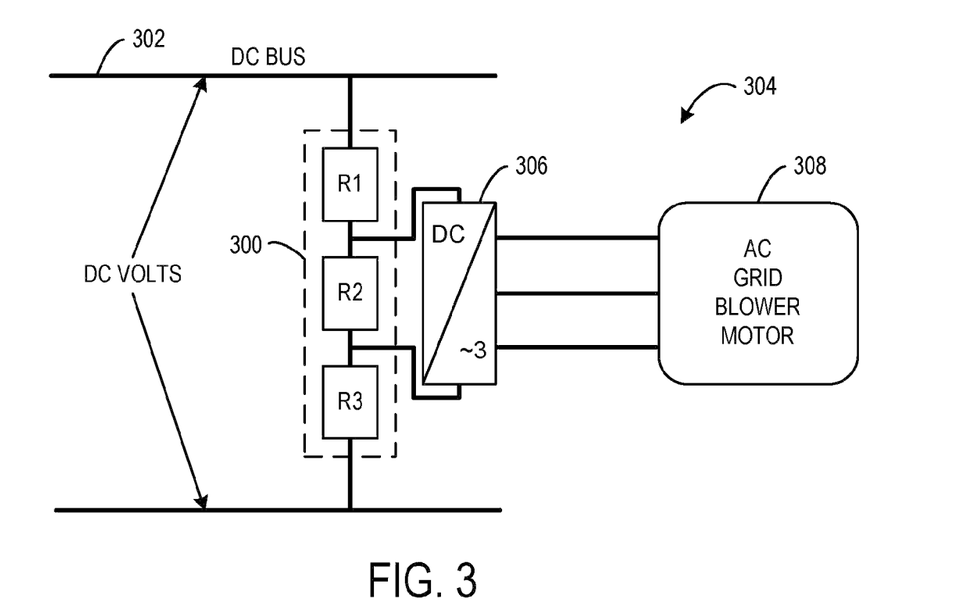
FIG. 3 shows a schematic diagram of another embodiment of a grid blower drive configuration.

FIG. 3 schematically shows another embodiment of a grid blower drive configuration of the present disclosure. In the illustrated embodiment, a grid 300 includes three resistive elements (R1, R2, R3) that are connected in series to a DC electrical bus 302. A grid blower (not shown) may be provided to generate forced-air cooling of the grid 300. The grid blower may be powered by a grid blower drive 304 that includes an inverter 306 that may be connected to taps across the grid 300. The inverter 306 may be configured to provide variable frequency and/or variable voltage AC output to an AC grid blower motor 308 that is coupled to an output of the inverter 306. As a particular example, the inverter may be a DC to three phase inverter having three phase AC output. It will be appreciated that, in this embodiment of the drive configuration, since the inverter is connected to taps across the resistance of the grid, the amount of current provided to the inverter and/or the grid blower motor may increase. Further, since the current is increased, a different AC grid blower motor may be used for forced-air cooling of the grid. For example, a larger and/or more powerful AC grid blower motor, a lower voltage motor, or standard voltage (insulation type) motor may be employed.

Note, in the illustrated embodiment, the inverter may be connected across one or some of the resistors of the grid depending on the power handling capabilities of the inverter and/or the grid blower motor.

It will be appreciated that by using AC motors in the grid blower drives, drive maintenance may be reduced relative to using DC motors. In particular, DC motors have commutation brushes that require routine maintenance. Since AC motors lack commutation brushes reduced maintenance may be used. Moreover, since AC motors lack commutation brushes the blowers can be run at higher speeds before being mechanically limited as compared to DC motors which may be mechanically limited by the commutation brushes.

Figure 4:
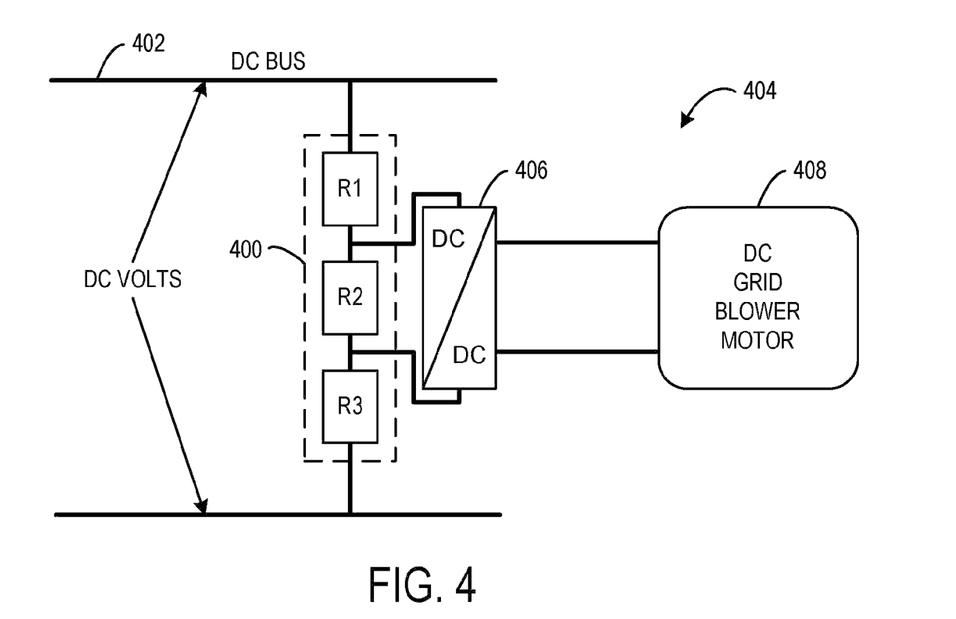
FIG. 4 shows a schematic diagram of yet another embodiment of a grid blower drive configuration.

FIG. 4 schematically shows yet another embodiment of a grid blower drive configuration of the present disclosure. In the illustrated embodiment, a grid 400 includes three resistive elements (R1, R2, R3) that are connected in series to a DC electrical bus 402. A grid blower (not shown) may be provided to generate forced-air cooling of the grid 400. The grid blower may be powered by a grid blower drive 404 that includes a DC-to-DC converter 406 that may be connected to taps across the grid 400. The DC-to-DC converter 406 may be configured to provide variable voltage DC output to a DC grid blower motor 408 that is coupled to the output of the DC-to-DC converter 406. This example drive configuration may be implemented as a reduced cost alternative to the above described embodiments, because the converter and/or the DC grid blower motor may cost less than an inverter and/or an AC grid blower motor. Note that only two wires are used to connect the one motor in series, but a configuration having three wires may be used for non series machine like parallel machines, or separately excited motors. Further note, a tap change between various voltage levels (e.g. a high voltage tap and a low voltage tap) may be utilized to achieve at least some of the variable speed control functionality.

Figure 5:
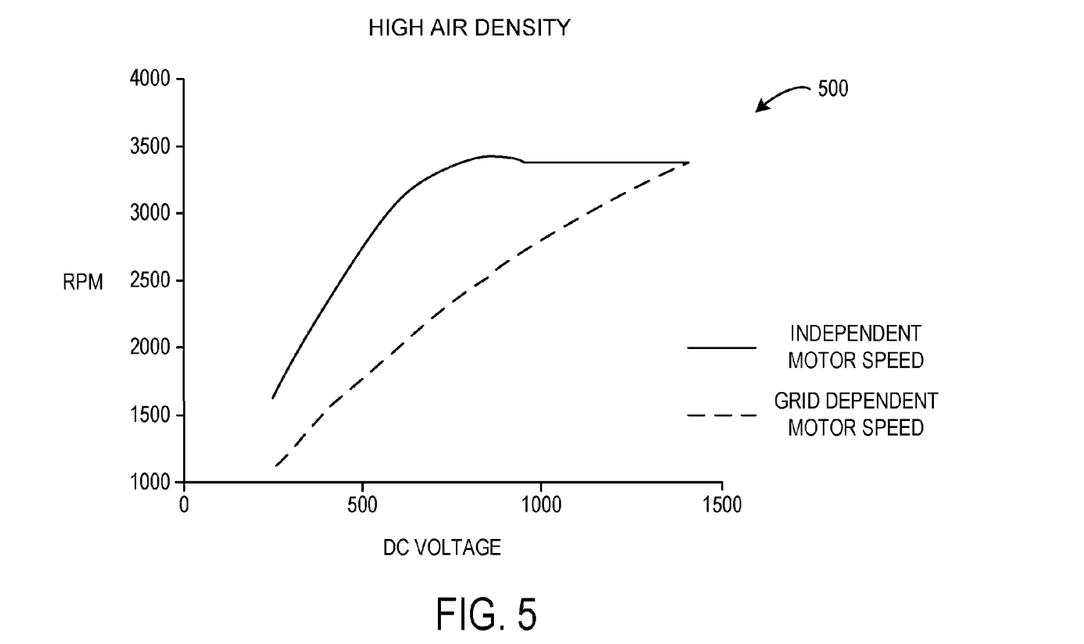
FIG. 5 shows a line graph comparing the performance of a grid blower connected to the grid blower drive configuration of FIG. 2 versus a grid blower directly connected across the resistive elements of a grid in a high air density environment.

FIG. 5 shows an example performance comparison of equal horsepower grid blower motors conducted in a high air density environment. The speed of a first motor is controlled independent of a grid voltage and the speed of a second motor is dependent on the grid voltage. For this example comparison, the first grid blower motor was connected according to the drive configuration shown in FIG. 2 and the second motor was directly connected to taps across the resistance elements of a grid. Accordingly, the operation of the first motor was independent of an amount of electrical power on the grid whereas the operation of the second motor was dependent on the amount of electrical power on the grid. Line graph 500 compares speed of the grid blower motors in revolutions per minute (RPM) along a Y-axis versus voltage in DC volts along an X-axis. The performance of the first grid blower motor is indicated by a solid line and the performance of the second grid blower motor is indicated by a dashed line.

The line graph 500 clearly shows that the first grid blower motor achieves a higher speed relative to the second grid blower motor when operating at the same voltage, thus indicating that the first motor may be independently controlled to accelerate faster than the second motor can accelerate based on the electrical power on the grid. The first motor operational acceleration advantage exists all the way until the operating speed performance limit of the grid blower motors is reached (at approximately 3400 RPM and 1400 VDC). Accordingly, due to the quicker acceleration, the first grid blower motor may achieve a maximum operating speed at a much lower voltage (approximately 800 VDC) as compared to that of the second grid blower motor (approximately 1400 VDC). Accordingly, the independently controlled grid blower may have enhanced forced-air cooling that may extend the operational lifetime of the grid.

Figure 6:
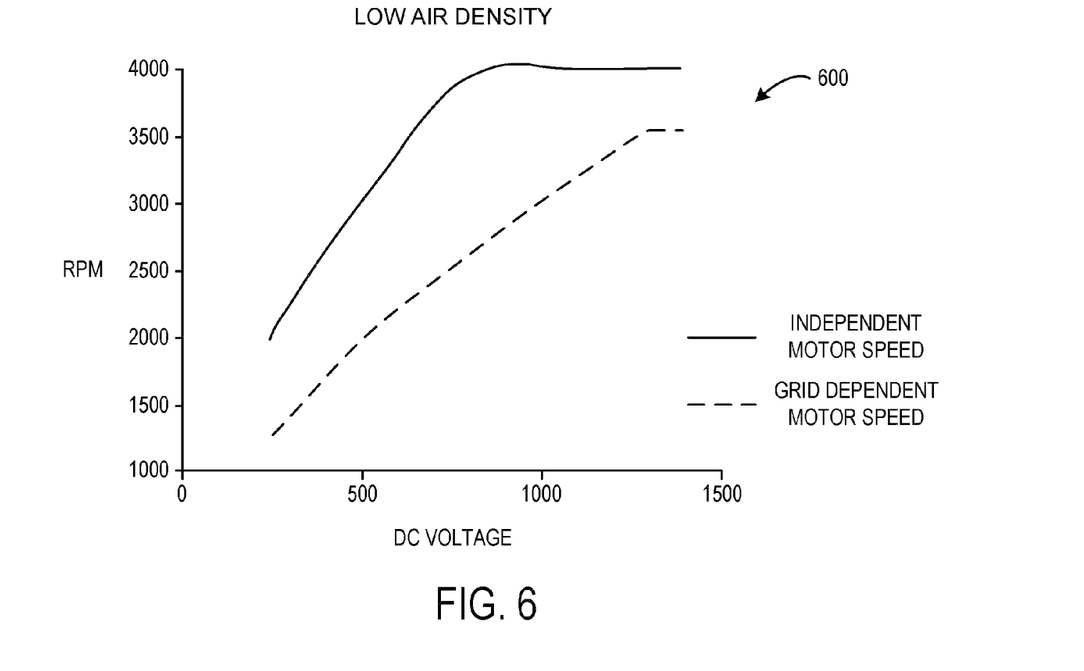
FIG. 6 shows a line graph comparing the performance of a grid blower connected to the grid blower drive configuration of FIG. 2 versus a grid blower directly connected across the resistive elements of a grid in a low air density environment.

Moreover, the operational advantages of the first grid blower motor as compared to the second grid blower motor are even more pronounced in a low air density environment. FIG. 6 shows an example performance comparison of the equal horsepower grid blower motors of FIG. 5 conducted in a low air density environment in a line graph 600. Similar to the high air density example, the first grid blower motor achieves a higher speed relative to the second grid blower motor when operating at the same voltage, due to due to decoupled ratio of motor voltage and grid resistance voltage and also due to frequency control of the inverter of the first grid blower motor. However, due to the low air density, the first grid blower motor is capable of achieving a higher maximum speed than the second grid blower motor. In a particular case where the second grid blower motor is a DC motor, the speed capability of second grid blower motor may be mechanically restricted by the commutation brushes of the DC grid blower motor whereas the first motor may be an AC grid blower motor that operates without commutation brushes and has a higher mechanical threshold. Accordingly, the AC grid blower motor may maintain an operational advantage over the DC grid blower across a greater operational range in a low air density environment.

It will be appreciated that the comparisons illustrated in FIGS. 5 and 6 are examples. Further, note that a comparison of a DC motor connected according to the above described drive configuration may have an operational advantage over a DC motor that is directly connected to the grid.

Figure 7:
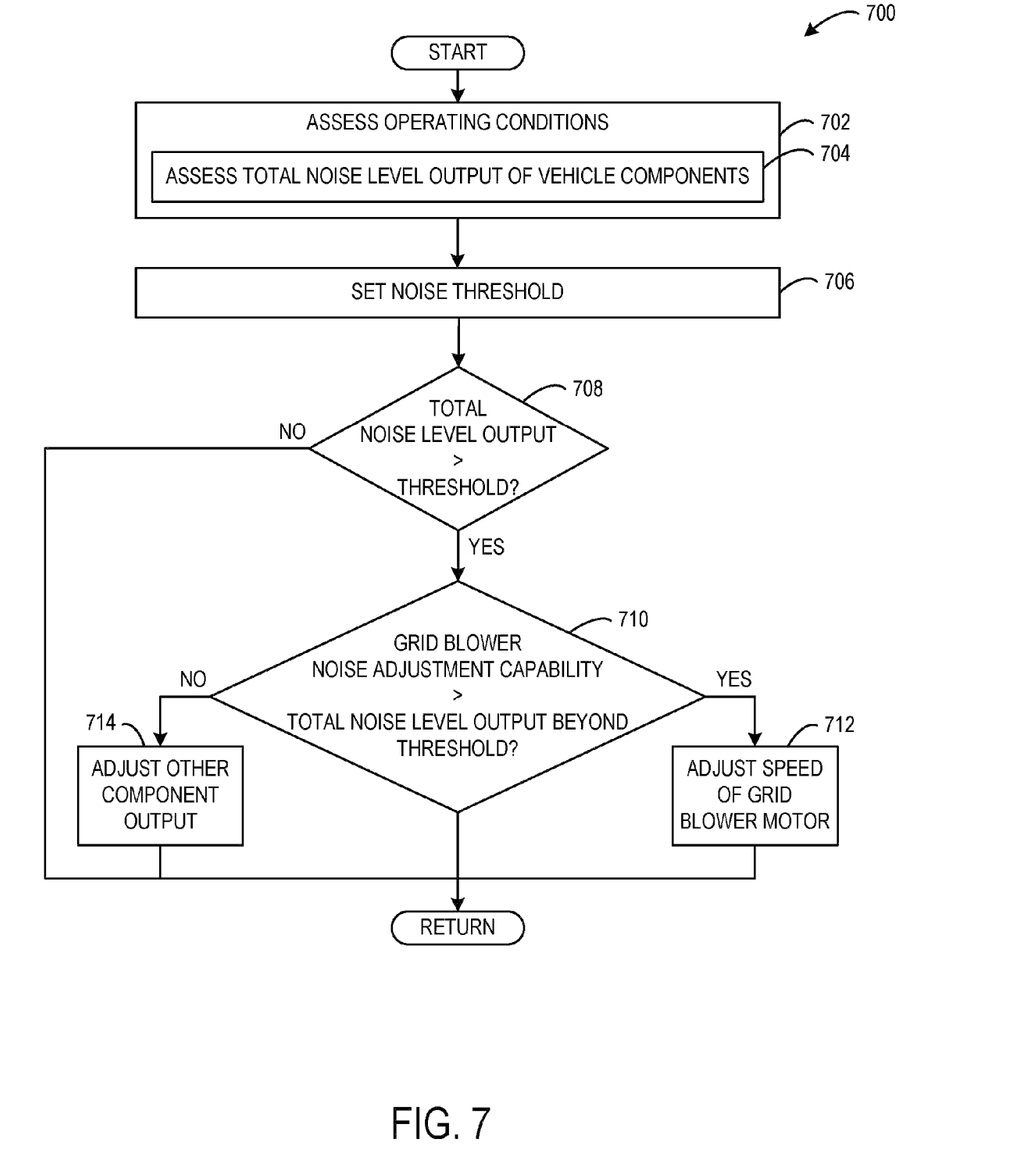
FIG. 7 shows a flowchart of an example audible noise level control method.

In general, the grid blower may be operated at as high of a speed as possible in order to generate maximum cooling of the grid. However, under some conditions, it may be desirable to operate the grid blower motor at a different speed. For example, the grid blower motor speed may be adjusted based on an audible noise level generated as a result of noise, vibration, harshness produced by the grid blower. In one particular example, a locomotive may be required to operate below an audible noise threshold level while traveling through different areas, such as a residential area or a mountain pass. In order to meet the audible noise threshold various components of the locomotive, including the grid blower, may be adjusted in order to reduce the audible sound level. FIG. 7 shows a flowchart of an example method for controlling audible noise output of a locomotive based on the audible noise output capability of a grid blower. A flowchart 700 begins at 702, where the method may include assessing operating conditions of the locomotive vehicle system. Nonlimiting examples of operating conditions that may be assessed include vehicle travel speed, engine speed, motor speed, ambient temperatures, component temperatures, air density, etc.

At 704, the method may include assessing the total audible noise level output of components of the locomotive based on the assessed operating conditions. In one example, an audible noise level for each component of the locomotive may be determined based on one or more given operating parameters of the component. In particular, the audible noise level of each component may be mapped to the one or more operating parameters in a look-up table stored in memory. Thus, a noise level for each component may be determined from the look-up table in order to assess the total audible noise level of the locomotive.

At 706, the method may include setting an audible noise threshold. The audible noise threshold may indicate a level of audible noise that should not be exceeded by the total audible noise level generated by the operation of the locomotive. In some embodiments, the audible noise threshold may be set based on a location of the locomotive. For example, the threshold may be set to a high audible noise level when the locomotive is traveling through rural areas and the threshold may be set to a low audible noise level when the locomotive is traveling through urban areas. In one example, the threshold level based on location may be set manually. In another example, the location may be inferred based on the speed of the locomotive and the threshold may be set based on the speed. In yet another example, the audible noise threshold may be based on global positions system coordinate information or based on another signal received by the locomotive, such as from extended radio frequency signals sent from sensors proximate to the railroad track. For example, a sensor at a railroad crossing or a bridge may send a signal to the locomotive. In yet another example, the threshold may be based on a configuration of the locomotive. For example, the threshold may be set based on the number of grid blowers and/or other equipment currently operating.

At 708, the method may include comparing the total audible noise level of the locomotive with the threshold audible noise level. If it is determined that the total audible noise level of the locomotive exceeds the threshold audible noise level, the flowchart moves to 710. Otherwise, the flowchart ends.

At 710, it has been determined that the total audible noise level exceeds the threshold audible noise level. Accordingly, the operational audible noise level of the locomotive should be reduced. Therefore, the method may include comparing the grid blower audible noise level adjustment capability to the audible noise level that exceeds the threshold audible noise level. In other words, the comparison determines if a change in grid blower operation is capable of lowering the total audible noise level below the threshold audible noise level. If the grid blower audible noise level adjustment capability is greater than the audible noise level that exceeds the threshold audible noise level the flowchart moves to 712. Otherwise, the grid blower audible noise level adjustment capability is less than the audible noise level that exceeds the threshold audible noise level and the flowchart moves to 714.

At 712, the method may include adjusting the speed of the grid blower motor in order to reduce the audible noise level of the grid blower so that the total audible noise level of the locative may be reduced to below the threshold audible noise level.

At 714, the grid blower audible noise level adjustment capability is less than the audible noise level that exceeds the threshold audible noise level, so the method may include adjusting the operation of a locomotive component other than the grid blower in order to reduce the total audible noise level of the locomotive to below the threshold audible noise level. For example, the output of the engine and/or the traction motor may be adjusted to reduce the audible noise level of the locomotive to below the threshold audible noise level.

Since the speed of the grid blower does not depend on the electrical power on the grid, the grid blower may be adjusted to achieve various operating objectives. In particular, under some conditions, the speed of grid blower may be adjusted to a high speed to provide enhanced forced-air cooling that would not be achieved as quickly if the operation of the grid blower was dependent on the electrical power on the grid. Moreover, under some conditions, the speed of the grid blower may be adjusted to reduce a level of audible noise in order to meet a desired audible noise level.

Figure 8:
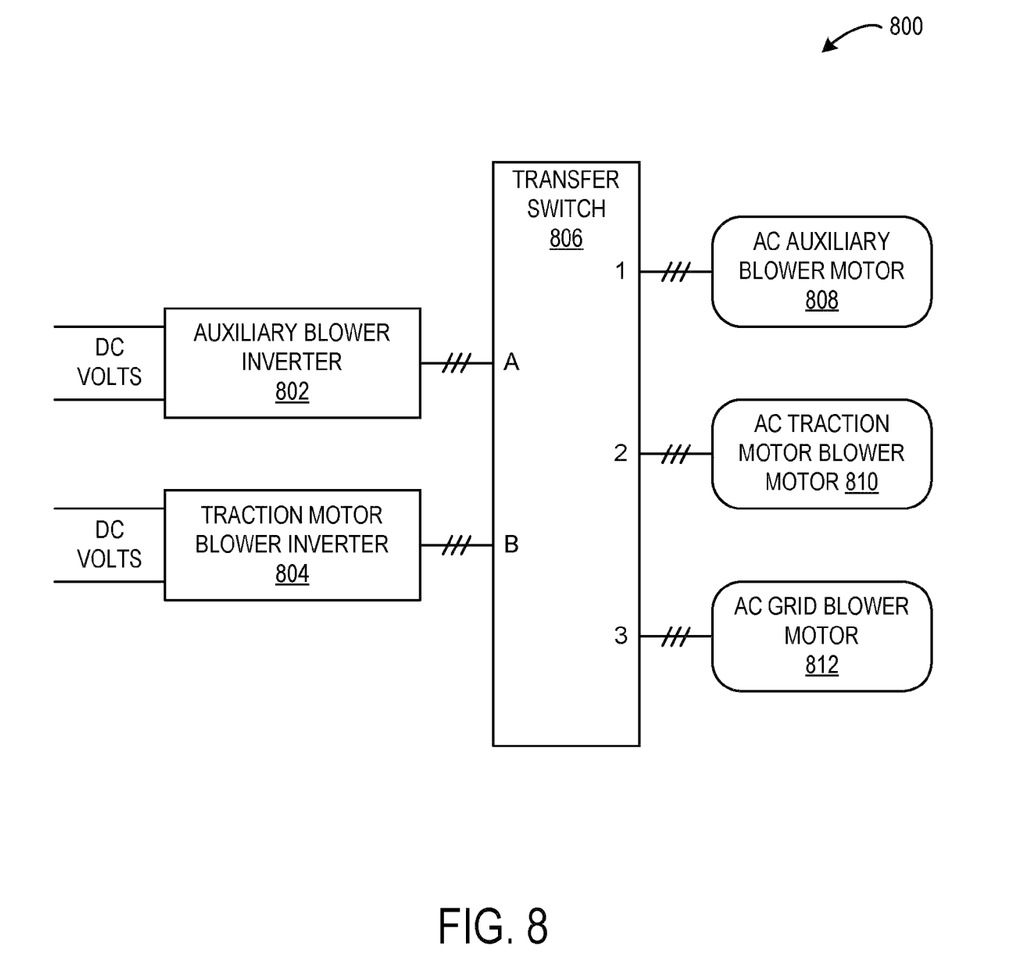
FIG. 8 shows a schematic diagram of an embodiment of an inverter-motor coupling configuration.

FIG. 8 schematically shows an example of an inverter-motor drive coupling configuration. The inverter-motor coupling configuration utilizes a transfer switch to enable two different inverters to each selectively provide electrical power to one of three different motors of the locomotive vehicle system based on operating conditions. The inverter-motor coupling configuration 800 includes an auxiliary blower inverter 802 and a traction motor blower inverter 804 coupled to respective inputs of a transfer switch 806. Both of the auxiliary blower inverter 802 and the traction motor blower inverter 804 may be configured to receive DC voltage from a DC power source, such as a DC bus. Further, both of the auxiliary blower inverter 802 and the traction motor blower inverter 804 may be configured to invert the DC voltage to AC voltage, and in some cases, may vary the frequency and/or the voltage to a suitable form for one of the motors.

An AC auxiliary blower motor 808, an AC traction motor blower motor 810, and an AC grid blower motor 812 may be coupled to respective outputs of the transfer switch 806. The AC auxiliary blower motor 808 may be configured to provide electrical power to an auxiliary blower to provide forced-air cooling. It will be appreciated that forced-air cooling may be provided by the auxiliary blower to cool an auxiliary component of the locomotive vehicle system. For example, the auxiliary component may include a radiator blower to cool a radiator of the locomotive vehicle system. As another example, the auxiliary component may include an intake air cooler to cool intake air being drawn in for compression by a compression device. The AC traction motor blower motor 810 may be configured to provide electrical power to a traction motor blower to provide forced-air cooling to the traction motor. The AC grid blower motor 812 may be configured to provide electrical power to a grid blower to provide forced-air cooling to the grid.

The traction motor blower inverter 804 may be designated for primarily providing electrical power to the traction motor blower motor 810, and under some conditions, may provide electrical power to one of the other motors connected to the transfer switch 806. Similarly, the auxiliary blower inverter 802 may be designated for primarily providing electrical power to the auxiliary blower motor 808 of an auxiliary component of the locomotive vehicle system, and under some conditions, may provide electrical power to one of the other motors connected to the transfer switch 806.

It will be appreciated that the above described configuration may be modified to include additional blower motors and/or inverters selectively connected via one or more switches without departing from the scope of the present disclosure. In some embodiments, one or more AC blower motors may be replaced by a DC motor connected to a chopper or speed control circuit.

Figure 9:
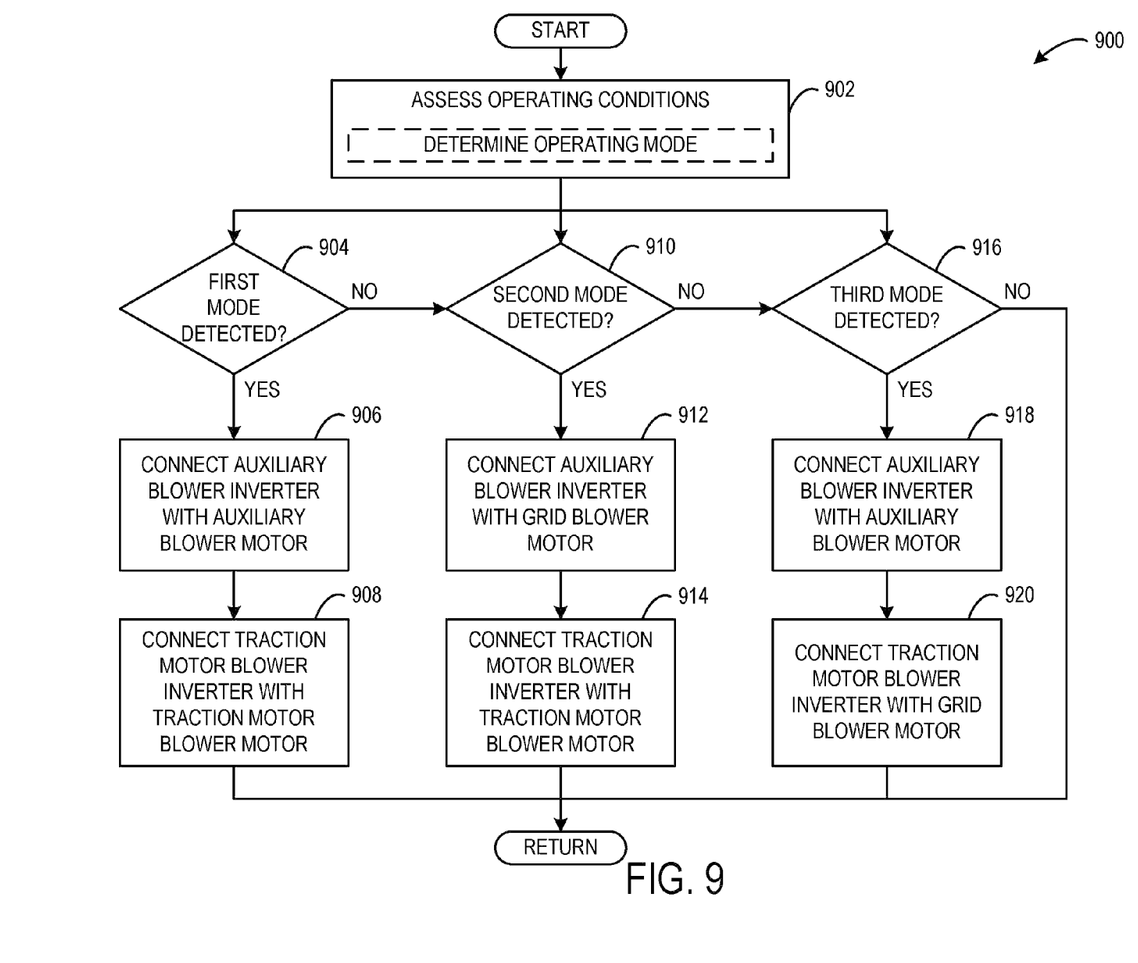
FIG. 9 shows a flowchart of an example electrical power distribution method utilizing the inverter-motor coupling configuration of FIG. 8.

FIG. 9 shows a flowchart of an example method for distributing electrical power by controlling the transfer switch of FIG. 8 based on operating conditions of the locomotive vehicle system. More particularly, the electrical power may be selectively distributed from the inverters to the motors based on an operating mode of the locomotive vehicle system. A flowchart 900 begins at 902, where the method may include assessing operating conditions. Assessing the operating conditions may include receiving signals from sensors and calculating various operating parameters based on the signals from the sensors. The operating parameters may include, but are not limited to, engine load, traction motor load, heat dissipation grid load, etc. Further, assessing the operating parameters may be performed in view of the current system configuration. The system configurations may include the engine transferring electrical power to the traction motors, the engine transferring at least a portion of electrical power to the grids, the traction motors supplying at least a portion of electrical power to the grids. The assessed operating conditions may be used to detect a mode of operation of the locomotive vehicle system.

At 904, the method may include detecting if the locomotive vehicle system is operating in a first mode, such as a motoring mode. The motoring mode may include operation of the engine to generate electrical power for the traction motor so that the traction motor may generate torque output to propel the locomotive vehicle system. If the motoring mode is detected, the flowchart moves to 906. Otherwise, the motoring mode is not detected and the flow chart moves to 910.

At 906, the method may include connecting the auxiliary blower inverter with the auxiliary blower motor. It will be appreciated that operation of the auxiliary blower may correspond to engine operation, in some examples. In one example, during the motoring mode, the auxiliary blower may be used for forced air-cooling of an auxiliary component such as the radiator which may used to dissipate engine heat during engine operation. In another example, during motoring mode, the auxiliary blower may be used for cooling of intake air to improve combustion efficiency of the engine.

At 908, the method may include connecting the traction motor blower inverter with the traction motor blower motor. During the motoring mode, since the traction motor is operational, the traction motor blower may be provided with electrical power in order to provide forced-air cooling to the traction motor. During the motoring mode, since the engine and traction motors are operational and little or no electrical power is provided to the grid, operation of the blowers associated with the engine and traction motor may be prioritized over the grid blower.

At 910, the method may include detecting if the locomotive vehicle system is operating in a second mode, such as a dynamic braking mode. The dynamic braking mode may include operation of the traction motors to generate torque output to slow the locomotive vehicle system. The torque output may generate electrical power that may be provided to the grid. If the dynamic braking mode is detected, the flowchart moves to 912. Otherwise, the dynamic braking mode is not detected and the flow chart moves to 916.

At 912, the method may include connecting the auxiliary blower inverter with the grid blower motor. During the dynamic braking mode, the temperature of the grid may increase as a result electrical power produced by the traction motors flowing across the resistors of the grid. Accordingly, the grid blower may be provided with electrical power in order to provide forced-air cooling to the grid.

At 914, the method may include connecting the traction motor blower inverter with the traction motor blower motor. Since the traction motor is operational during the dynamic braking mode, the traction motor blower may be provided with electrical power in order to provide forced-air cooling to the traction motor. During the dynamic braking mode, since the traction motor is operational and electrical power is provided to the grid, operation of the blowers associated with the traction motor and the grid may be prioritized over the auxiliary blower.

At 916, the method may include detecting if the locomotive vehicle system is operating in third mode, such as a self loading mode. The self loading mode may include operation of the engine to generate electrical power to load the locomotive vehicle system for diagnostic purposes, for example. During the self loading mode, electrical power generated as a result of engine operation may be provided to the grid and little or no electrical power may be provided to the traction motors. If the self loading mode is detected, the flowchart moves to 918. Otherwise, the self loading is not detected and the flow chart ends.

Alternatively, the third mode may be another operating mode where at least some electrical power is supplied to grid blower via the inverters and substantially no electrical power is supplied to the grid. The third operating mode may be performed for purposes of de-icing the grid of resistive elements at cold climates as well as to move bearings of the grid blower for anti-bernelling purposes so lubrication film on the bearings remains effective. In one example, the grid blower may be operated based on lubrication hardness level such that the grid blower may be operated to move bearing of the grid blower in order to prevent the lubrication of the bearings from reaching a predetermined level of hardness.

Additionally, this third mode of operation may be performed after a braking operation, wherein elements of the grid have increased in temperature and the grid blower may be operated to cool the elements even though no electrical power is being dissipated in the grids. In previous systems at power down, the hot elements such as grid elements which dissipate power for a period of time continue to radiate and heat the relatively cooler elements like insulation devices. Since there is no airflow, the insulation devices initially heat up to a higher temperature than during powered operation and then cool down to ambient. Since these type of materials generally degrade quickly at higher temperatures, this transient higher temperature causes a higher failure rate. In this third mode of operation, since the air flow is maintained, this does not happen and the temperature does not increase and the failure mode is reduced or eliminated.

At 918, the method may include connecting the auxiliary blower inverter with the auxiliary blower motor. Since the auxiliary blower may be related to engine operation and the engine may be operational during third mode, the auxiliary blower may be provided with electrical power in order to provide forced-air cooling.

At 920, the method may include connecting the traction motor blower inverter with the grid blower motor. During the third mode, since the grid or the electrical power bus is receiving electrical power, the grid blower may be provided with electrical power in order to operate to grid blower to provide forced-air cooling, de-icing, anti-bernelling, etc. During the third mode, since the engine may be operational and electrical power may be provided to the grid, operation of the blowers associated with the engine and the grid may be prioritized over the traction motor blower.

In some embodiments, during the different operating modes, the grid blower motor may be operated temporarily in a reverse direction for intake cleaning purposes such as when an intake of the grid blower is blocked by debris. It will be appreciated that since the blower motors are connected to the inverters, electrical power may be applied to the grid without operation of the blower motors. For example, the grid may be powered without the blower running during light loads conditions, during low audible noise output conditions, or for preventing moisture/ice formation on the grid.

It will be appreciated that connection of an inverter with a motor as described in the above method may be achieved through control of state the transfer switch, such as by a controller of the locomotive vehicle system. By connecting the inverters and motors to a transfer switch and controlling the state of the transfer switch based on the mode of operation of the locomotive vehicle system, distribution of electrical power may be prioritized to components that are operational during the particular operating mode. Accordingly, the amount of inverters for use with the motors may be reduced and locomotive vehicle system production costs may be reduced.

In some embodiments, one or more AC blower motors and their inverters may be replaced with a DC motor connected via a chopper or speed control circuit. Further, the transfer switch may be controlled to selectively connect the DC motors with the chopper circuit based on operating mode.

Note that the example control and estimation routines and/or methods included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of controlling a grid blower to provide forced-air for a grid of resistive elements of a vehicle, the method comprising:
generating an amount of electrical power across the grid of resistive elements based on an operation of the vehicle;
operating a motor of the grid blower with the electrical power generated across the grid of resistive elements, the grid blower positioned proximate the grid of resistive elements and operated to blow air over the grid of resistive elements; and
modulating at least some of the amount of electrical power to adjust at least one of a speed and a direction of the motor of the grid blower based on an operating condition;
wherein the operation of the vehicle includes a dynamic braking operation in which the amount of electrical power is generated by a traction motor, and
wherein operating the motor of the grid blower comprises operating the motor of the grid blower at a speed independent of the amount of electrical power generated across the grid of resistive elements.

2. The method of claim 1, wherein modulating at least some of the amount of electrical power continues after the braking operation without dissipation of electrical power on the grid of resistive elements.

3. The method of claim 1, wherein the operation of the vehicle includes a self loading operation in which the amount of electrical power is generated by a converter configured to be driven by torque output of an internal combustion engine.

4. The method of claim 1, wherein the operating condition includes an audible noise level.

5. The method of claim 1, wherein the operating condition includes a temperature of the grid of resistive elements.

6. The method of claim 1, where the operating condition includes bearing lubrication hardness.

7. The method of claim 1, wherein the operating condition includes at least one of inertial force exerted on the grid blower and centrifugal force exerted on the grid blower.

8. The method of claim 1, wherein the operating condition includes an ambient temperature signal, and wherein modulating at least some of the amount of electrical power comprises modulating at least some of the amount of electrical power to prevent ice formation on the grid of resistive elements.

9. The method of claim 1, wherein at least the direction of the motor of the grid blower is adjusted to prevent blockage of an intake of the grid blower.

10. The method of claim 1, wherein modulating at least some of the amount of electrical power includes adjusting at least one of a voltage level and a frequency.

11. The method of claim 1, wherein modulating at least some of the amount of electrical power to adjust at least one of a speed and a direction of the motor of the grid blower based on an operating condition comprises modulating at least some of the amount of electrical power via a power modulation device directly coupled across a subset of resistive elements of the grid of resistive elements.

12. The method of claim 1, wherein operating the motor of the grid blower at a speed independent of the amount of electrical power generated across the grid of resistive elements further comprises operating the motor of the grid blower at a constant speed even as the electrical power generated across the grid of resistive elements changes.

13. The method of claim 5, wherein modulating at least some of the amount of electrical power to adjust at least one of the speed and the direction of the motor of the grid blower based on the temperature of the grid of resistive elements comprises increasing the speed of the motor as the temperature of the grid increases.

14. The method of claim 11, wherein the power modulation device is directly coupled in parallel across a subset of resistive elements of the grid of resistive elements.

15. The method of claim 14, wherein the power modulation device is directly coupled in parallel across a subset of the resistive elements via a first electrical connection between a first two resistive elements of the grid of resistive elements and a second electrical connection between a second two resistive elements of the grid of resistive elements, wherein the grid of resistive elements comprises a plurality of resistive elements connected in series to an electrical bus.

* * * * *